Sept. 24, 1940.         J. N. GILBERT                2,215,609
            AUTOMATIC VARIABLE PITCH AIRCRAFT PROPELLER
                    Filed Aug. 8, 1938        2 Sheets-Sheet 1
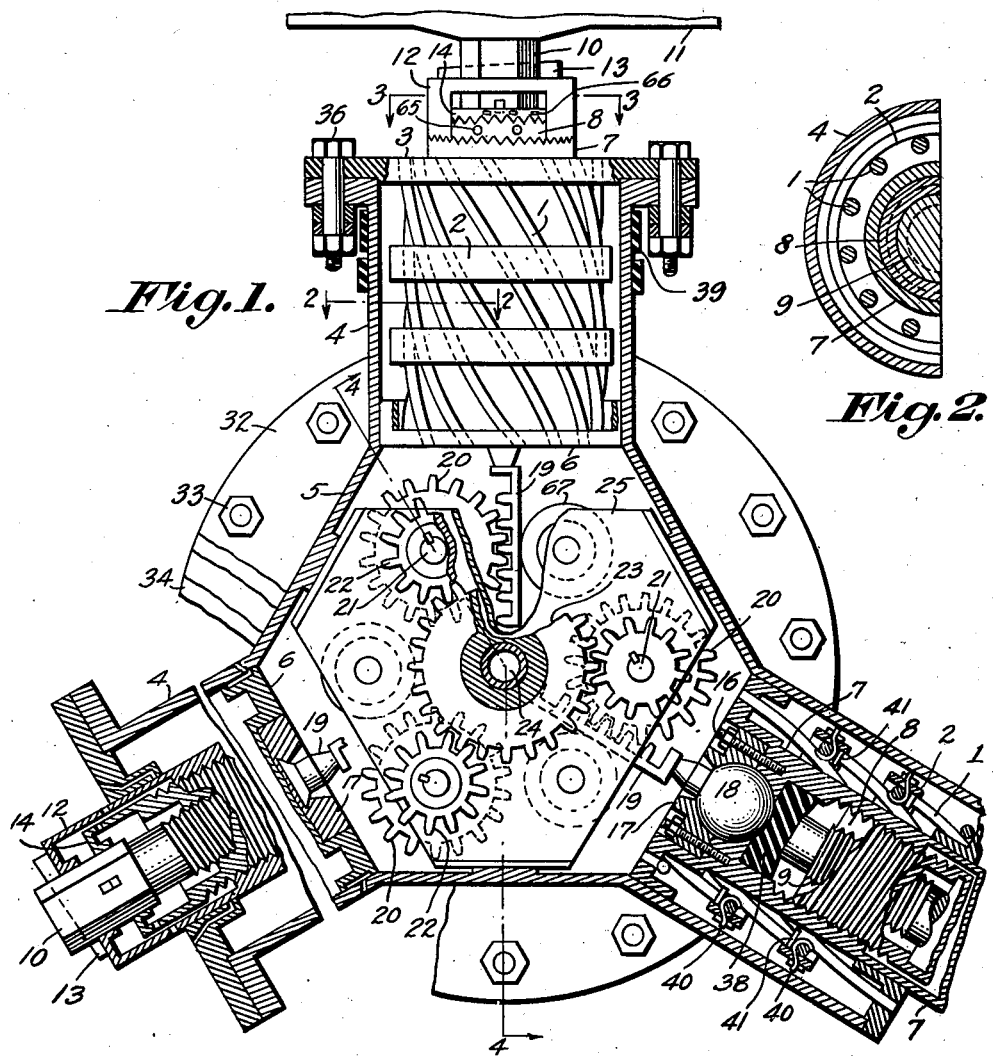
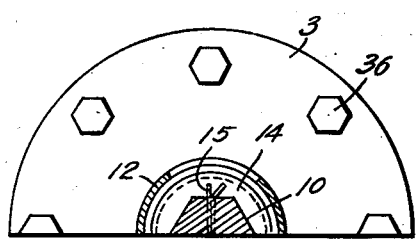
Inventor
JOSEPH N. GILBERT,
SIGFRID SOMMER, Special
Administratrix of the estate of
JOSEPH N. GILBERT, deceased,
By Ellis S. Middleton
        Attorney.

Sept. 24, 1940.    J. N. GILBERT    2,215,609
AUTOMATIC VARIABLE PITCH AIRCRAFT PROPELLER
Filed Aug. 8, 1938    2 Sheets-Sheet 2
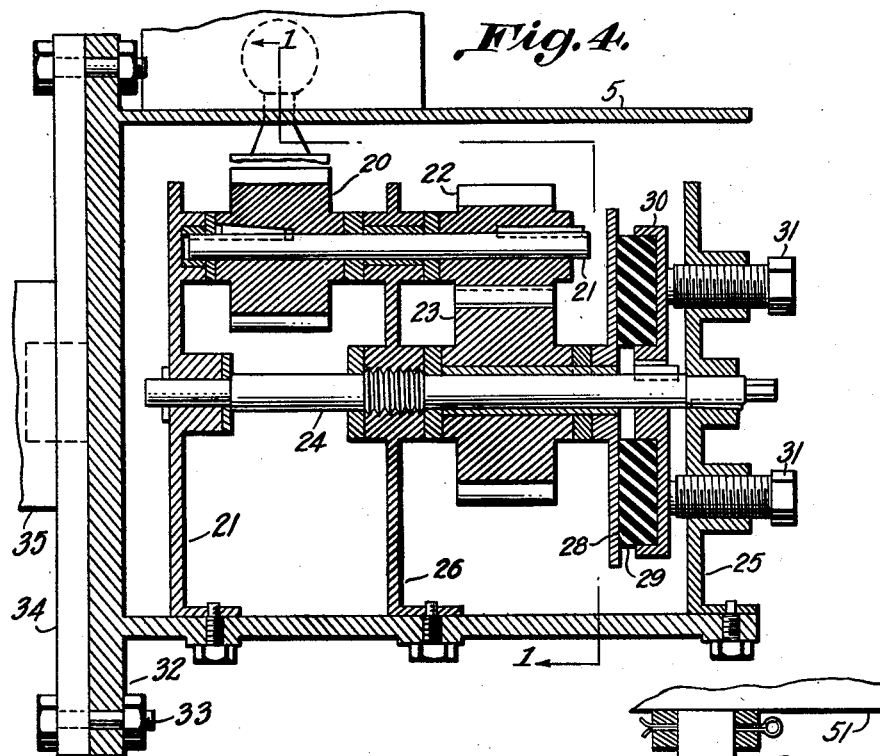
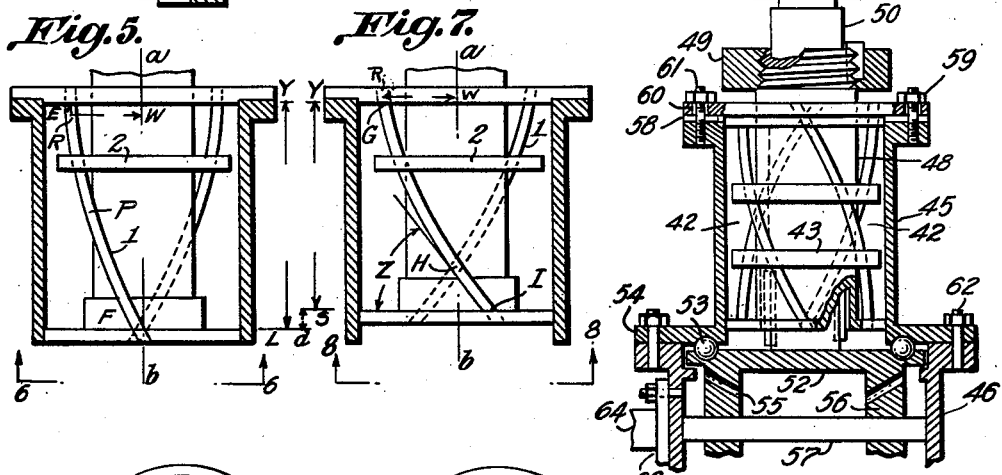
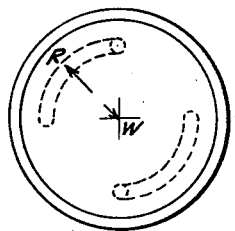
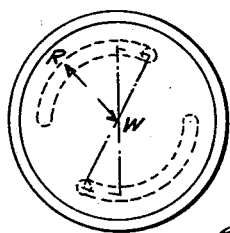
Inventor
JOSEPH N. GILBERT,
SIGFRID SOMMER, Special
Administratrix of the estate of
JOSEPH N. GILBERT, deceased,
By Erin S. Middleton Attorney.

Patented Sept. 24, 1940

2,215,609

UNITED STATES PATENT OFFICE 2,215,609

AUTOMATIC VARIABLE PITCH AIRCRAFT PROPELLER

Joseph N. Gilbert, Oxboro, Minn.; Sigfrid Sommer, administrator of said Joseph N. Gilbert, deceased, assignor to Mary Jarvis Gilbert, Minneapolis, Minn.

Application August 8, 1938, Serial No. 223,646

4 Claims. (Cl. 170—162)

It is in accordance with recognized facts that an engine has its efficient speed, that for aircraft engines to approach this efficient speed a nearly flat propeller blade pitch, that steepens as the plane acquires speed, is desirable during the take off, while a steeper pitch variable with the altitude, is required during efficient speed in level flight.

Among other things, the object of this invention is to utilize the centrifugal force of a rotating blade or counterweight to automatically vary the blade pitch responsive to a variation in the rotative speed of the engine, whereby the engine may start with a flat or nearly flat propeller blade pitch which will automatically steepen with an increase of the engine's rotative speed, so that when the efficient speed is reached, the blade pitch will be commensuate with the power of the engine at that speed.

Furthermore, the automatically varying blade pitch by steepening to oppose an increase of the engine's rotative speed, and flattening to oppose a decrease of the engine's rotative speed, tends to maintain the rotative speed of the engine constant when its efficient speed is reached.

Further and ancillary objects will appear in the description. These objects I attain with a steep pitch spring mechanism that sustains the blade's varying centrifugal force acting along an axis radial to the propeller hub, and transforms said varying force into an oscillatory force acting about said radial axis to vary the blade pitch in two directions, respectively responsive to an increase or a decrease in the engine rotative speed.

This spring mechanism comprises a plurality of helical springs so formed and arranged that a variation in the springs' axial length causes their rotatable ends to rotate; and in order to obtain accurate and efficient rotation of said rotatable ends, the helical radius of the springs is restricted during their variation in axial length.

In the preferred form of this invention the helical radius of the springs is restricted by a plurality of hoops mounted upon and rotatable and reciprocatable with the springs, thereby avoiding a rubbing contact between the springs and their restricting members.

For a more detailed description of my invention, reference is made to the accompanying drawings, in which Fig. 1 is a cross-section substantially on the line 1—1—1 of Fig. 4, and showing the assembled operative invention as applied to a three blade propeller having a hub with three sockets.

The upper cross-sectioned socket exposes an elevation view of the steep pitch spring mechanism that varies the blade pitch; while in the right hand socket the spring mechanism is also cross-sectioned exposing to view the screw device adapted to the adjustment of the initial blade pitch, and also the adjustment of the moment of the blade about the propeller axis; the spring mechanism is not shown in the left hand socket which shows in cross-section the caps that hold the blade in its adjusted angular position relative to its shank.

In the central part of the view is shown the pitch equalizing mechanism.

Fig. 2 is a view on line 2—2 of Fig. 1.
Fig. 3 is a view on line 3—3 of Fig. 1.
Fig. 4 is a view on line 4—4—4 of Fig. 1.
Fig. 5 is a view of the steep pitch spring mechanism on a reduced scale and having only two springs, used in explaining the principle of the end rotations of the steep pitch spring.
Fig. 6 is a view on line 6—6 of Fig. 5.
Fig. 7 shows the same spring mechanism as Fig. 5, but with the springs' axial length reduced by compression.
Fig. 8 is a view on line 8—8 of Fig. 7, showing that during the compression, the ends of the spring are rotated through the circular arc X.
Fig. 9 is a view showing a cross-section in elevation of a modification of my invention in which the blade pitch is varied by a steep pitch spring mechanism actuated by a centrifugally actuated counterweight.

In Fig. 1, the pitch varying spring mechanism comprises a plurality of fractional turn steep pitch helical springs 1 of a common radius and circumferentially arranged about an axis substantially radially aligned to the propeller hub. The said common radius is restricted by the restricting hoops 2. Said steep pitch springs have respective ends connected to the flanged cap 3 of the socket 4 of the hub 5; and the other respective ends of said springs are connected to the flange 6 of the hollow blade shank 7 screwed to the adjusting sleeve 8, which is screwed to the threaded end 9 of the hexagonal terminal 10 of the blade 11.

On the said hexagonal terminal is slidably mounted the cap 12 held by key 13 against the said blade shank so that the toothed rim of the cap meshes with the toothed rim of the shank to fix the adjusted angular position of the blade relative to its shank.

Also on the said hexagonal terminal is slidably mounted the cap 14 held by key 15 against the said adjusting sleeve so that the toothed rim of the cap meshes with the toothed rim of the sleeve to fix the adjusted angular position of the blade relative to the sleeve.

Attached to the blade shank by the bolts 16 are the blocks 17 supporting the spherical member 18 rigidly attached to the toothed rack 19 which meshes with the pinion 20 keyed to the axle 21 on which is also keyed the pinion 22 which meshes, with the equalizing gear 23 to maintain an equality of pitch of the several blades, as well as to maintain an equality of moments of the said blades about the propeller axis.

Said equalizing gear is rotatably mounted on the fixed axle 24 supported by the bearing members 25, 26 and 27.

Also slidably and rotatably mounted on the said fixed axle, notched into and rotatable with the said equalizing gear, is the metal disk 28 on which presses the medium soft rubber ring 29 supported by the member 30 which is mounted on and slidably keyed to the said fixed axle.

The screws 31 apply pressure to the said rubber ring.

The hub flange 32 is fastened by the bolts 33 to the flange 34 of the engine shaft 35.

Connecting the hub cap to the hub are the bolts 36 supplied with removable washers 37.

The function of the soft rubber pad 38 is to dampen out the vibrations in the blade shank, while the tightly drawn rubber bands 39 dampen out the vibrations in the hub socket, just as a rubber band tightly drawn around a small bell will deaden its sound.

The hooks 40 clamp the diametrally restricting hoops to the several steep pitch springs.

On each of the said steep pitch springs, the small circular projections 41 hold the said hoops from sliding radially outward under the pressure of centrifugal force.

In the modification of my invention Fig. 9, the springs 42 are radially restricted by the hoops 43 and have their respective fixed ends connected to the flanged cap 44 of socket 45 of hub 46; while the other respective ends of said springs are fastened to and are rotatable and reciprocatable with the flanged end 47 of the sleeve 48 which is screwed to and slidable with the counterweight 49 slidably mounted on the shank 50 which is screwed to the blade 51. The other end of the said shank is rigidly attached to the flanged bearing 52 supported by the balls 53 which are supported by the flange 54 of the hub socket.

Arranged on said flanged bearing are the bevel gear teeth 55 meshing with the equalizing gears 56 which are rotatably mounted on the axle 57. Said equalizing gears are adapted to mesh with bevel gears not shown to equalize the pitch of a blade not shown.

The saw teeth 58 on the flanges of the hub socket and its abutting cap, hold the flanged cap in its adjusted angular position by tightening the nuts 59 after the cap has been turned to the desired angular position permitted by the slots 60 cooperating with the bolts 61. The bolts 62 fasten the socket to the hub. 63 is the flange of the engine shaft 64. In Fig. 1, 65 are holes for inserting a tool to turn the threaded sleeve 8. 66 are holes for inserting a tool to lift the cap 14, so that its toothed edge will clear the toothed edge of the adjusting sleeve 8. 67 is a rolling pressure member that holds the rack 19 in meshing contact with the pinion 20.

*Principle of the rotating end of the steep pitch spring.*—In Fig. 5, in the one-quarter turn spring 1 of axial length Y—L, it is obvious that the helical length E, P, F exceeds the helical length G, J, H of the same helical radius R—W but shorter axial length Y—S of Fig. 7. Consequently, if the restricted helical radius R—W remains constant while the one-quarter turn spring 1 is compressed from axial length Y—L of Fig. 5 to form the one-quarter turn of shorter axial length Y—S of Fig. 7, there will be an excess of spring H—I, over a one-quarter turn in Fig. 7, or the end of the spring will have rotated through the circular arc X of Fig. 8.

*Operation.*—In Fig. 1, an increase in the rotative speed of the propeller hub 5 centrifugally actuates blade 11 with the attached shank 7, flange 6 and toothed rack 19 to move radially outward, thereby compressing and shortening the axial length of the plurality of springs 1, to cause their rotatable ends with their attached flange 6, shank 7, and blade 11, to rotate to vary the blade pitch through an angle equal to the angle X through which the ends of the springs rotate; while a decrease in the rotative speed of the hub 5 increases the axial length of the springs 1 to cause their rotatable ends to vary the blade pitch in the reverse direction, through a pitch angle equal to the angle through which the ends of the springs rotate.

Obviously, if the initial blade pitch be adjusted to zero to correspond to zero end rotation of the springs, then the arc X which designates the end rotation of the springs corresponding to a given variation Y—d in the springs' axial length, will also designate the blade pitch corresponding to the given variation in the springs' axial length, also corresponding to the rotative speed of the engine which centrifugally actuates the given variation in the springs' axial length.

*Operation of the equalizing mechanism.*—As the centrifugally actuated blade 11 moves radially outward, it moves its attached rack 19 to turn the pinion 20, axle 21, and pinion 22 which meshes with and turns the equalizing gear 23; and since all of the several pinions 22 mesh with the equalizing gear 23, the pinions 22 must all rotate unidirectionally, synchronously and equally thereby causing all of the respective racks 19 and the blades 11 to move radially outward or radially inward equally and synchronously to maintain an equality of moment of the respective blades about the propeller axis, also to cause the respective spring mechanisms to vary their axial length equally and synchronously to vary the pitch of the respective blades equally and synchronously.

In adjusting the initial blade pitch and the blade moment about the propeller axis, loosen the key 13 and lift the cap 12 so that its toothed rim clears the toothed rim of the shank 7; turn the blade 11 to the desired initial pitch and lower the cap 12 so that its toothed rim meshes with the toothed rim of the shank 7, thereby fixing the angular position of the blade relative to its shank; now remove the key 15 and lift the cap 14 so that its toothed rim clears the toothed rim of the adjusting sleeve 8, and by inserting a tool in the hole 65, screw the adjusting sleeve 8 into the shank 7 to decrease the moment of the blade about the propeller axis, and screw the sleeve 8 out of the shank 7 to increase the moment of the blade about the propeller axis; when this adjustment is made, lower the cap 14 so that its toothed rim meshes with the toothed rim on the sleeve 8, then drive keys 13 and 15 into place.

Rotating the sleeve 8 causes 8 to move in the same axial direction relative the shank 7, as the threaded blade terminal 9 moves relative to the sleeve 8. When the teeth on the cap 14 mesh with the teeth on the sleeve 8, the blade 11 may be turned to the initial pitch either by turning the sleeve 8 or by turning the blade; but if the cap 14 be eliminated from the mechanism, and it may be, then the blade can be adjusted to the initial pitch only by turning the blade.

With the washers 37 removed, the cap 3 with its connected springs 1, shank 7 and blade 11 may be moved radially outward, thereby bringing the blade 11 and its shank 7 to the same radial distance relative to the propeller axis as obtains when the engine is running at its efficient speed; and preferably while in this position the moments of the several blades about the propeller axis, should be finally adjusted to a perfect balance as above set forth. The respective caps 3 of the several hubs, the respective blades 11, shanks 7, springs 1, and hoops 2 should preferably be of equal weight and symmetrical.

In the adjusting sleeve 8, the right hand thread and the left hand thread may both be on the outside of the sleeve, or both be on the inside of the sleeve, and its meshing members arranged to conform thereto without departing from the spirit of my invention.

*Change of blade pitch X corresponding to a given change in the rotative speed of the engine shaft 35.*—If the blade be adjusted to zero pitch to correspond to zero end rotation of the springs and the restricted helical radius of the cylinder of the springs be maintained constant, then obviously the blade pitch X is a function of $n^2$, the square of the rotative speed of the engine shaft 35. Hence the equation $ax=n^2$, which differential gives the equation $adx=2ndn$; or the change in blade pitch corresponding to a given change in rotative speed, is dependent upon the rotative speed at the time of the change. Viz: when the engine is running at its efficient speed a given change in the rotative speed $n$ causes four times as much change in blade pitch as would the same change in rotative speed when the engine is running at one-quarter speed.

This is an important feature in maintaining constant efficient speed, for with the engine running at its efficient speed and with the springs formed and adjusted to give a blade pitch commensurate with the power of the engine at that speed, the slightest change in this high rotative speed will cause the sufficiently steep-pitched springs 1 to materially vary the blade pitch in such direction as to oppose further change in rotative speed.

Relation of the spring pitch angle Z in Fig. 7, to the length of the arc X of the blade pitch angle measured on the circumference of the spring as in Fig. 8: If the initial blade pitch is set at zero with the end rotation of the springs at zero, then it can be shown by calculus, that the blade pitch angle as designated by the length of the circular arc X measured on the circumference of the spring as in Fig. 8, equals the variation Y—$d$ in the spring's axial length multiplied by the tangent of the spring pitch angle $z$ as in Fig. 7, viz: In a spring pitch angle $z=45$ degrees, the tangent of $Z=1$, consequently, the variation Y—$d$ in axial length equals the length of the arc X; so that if the axial length is shortened by one inch, the length of the arc X will also be one inch, which measured on the circumference of a spring of 3 in. radius R—W as in Fig. 6, gives a blade pitch angle of approximately 19 degrees. With the same variation Y—$d=1$ inch, and the same steepness of the spring pitch Z, but larger radius R—W, the arc X of the blade pitch angle would be less than 19 degrees; while with the same variation Y—$d=1$ inch and the same radius R, but with steeper spring pitch Z, the arc X of the blade pitch would exceed 19 degrees.

*Note.*—In the preceding, the initial blade pitch was assumed to be zero for the purpose of simplifying the equation showing the relation of the variation Y—$d$ in axial length, to the length of the arc X designating the blade pitch. Obviously the initial blade pitch may be more than zero, or less than zero to retard the speed of the plane while landing; but preferably the initial blade pitch should be such that the additional variation in blade pitch caused by the engine rotating at efficient speed, will bring the blade to the required pitch at that speed. Viz: If the required blade pitch is 29 degrees, and the efficient speed of the engine varied the blade pitch only 19 degrees, then the initial blade pitch should be set at 10 degrees.

Obviously the spring pitch angle $z$ decreases as the spring 1 is compressed, consequently the variation Y—$d$ should be multiplied by the average of the tangents of the several pitch angles during the compression, to get a close approximation of the value of X.

*Operation of Fig. 9.*—In the modification of my invention Fig. 9, the rotating engine axle 64 centrifugally actuates the counterweight 49 to move radially outward with its attached sleeve 48 and flange 47 to vary the axial length of the drivably connected springs 42, and to cause their rotatable ends to rotate the sleeve 48 and its slidably connected blade shank 50 to vary the pitch of the blade 51. The centrifugal thrust of the blade 51 is supported by the disk 52 which is rotatable on the ball bearings 53.

Also in Fig. 9, the pitch of the several blades may be equalized by equalizing the variation in axial length of the several counterweight actuated spring mechanisms, substantially as shown in Fig. 1.

In Fig. 4, the pressure of the soft rubber rings 28 against the disk 29 should be such as to prevent the outward motion or vibration of the blade 11 due to very slight changes in rotative speed; but should permit the blade to move under the centrifugal force due to material variations in rotative speed.

Having described my invention and its principles of operation, I claim:

1. In a variable pitch aircraft propeller, in combination, a rotatable shaft, a hub mounted on said shaft and rotatable therewith, a blade rotatable with said hub and mounted thereon in reciprocatable alignment with and rotatable to vary its pitch about an axis substantially radially aligned to the hub, a plurality of fractional turn helical springs of common helical radius rotatable with said hub and mounted thereon with respective ends connected to the hub in such arrangement that their other respective ends are reciprocatable in alignment with and rotatable about the said radially aligned axis, a plurality of restricting members arranged and adapted to restrict the helical radius of said springs, said restricting members being mounted on said springs to reciprocate and rotate therewith, said restricted springs individually formed to such steepness of pitch that a decrease in their axial length causes said rotatable ends to rotate to a material degree about the said radially aligned axis, and an increase in their axial length causes said rotatable ends to rotate to a material degree in the reverse direction, said blade having a hollow shank, the latter having a flange member, the rotatable ends of the springs being socketed in the flange member, so that variations in the rotative speed of the shaft vary the centrifugal force of the blade to vary the axial length of the springs to cause said rotatable ends to vary the blade pitch to correspond to the shaft's rotative speed.

2. In a variable pitch screw propeller, in combination, a rotatable shaft, a hub mounted on said shaft and rotatable therewith, a blade rotatable with said hub and mounted thereon in reciprocatable alignment with and rotatable to vary its pitch about an axis substantially radially aligned to the hub, a plurality of helical springs rotatable with the hub and mounted thereon with respective ends connected to the hub in such arrangement that their other respective ends are reciprocatable in alignment with and rotatable about the said radially aligned axis, a restricting member arranged and adapted to restrict the helical radius of said springs, said restricting member being mounted on said springs to reciprocate and rotate therewith, said restricted springs individually formed to such steepness of pitch that varying their axial length causes said rotatable ends to rotate to a material degree about said radially aligned axis in directions respectively responsive to a decrease or an increase in their axial length, said blade being connected to said rotatable ends to rotate and reciprocate therewith, said connection comprising a hollow shank carried by the blade, with a flange member carried by the shank, said rotatable ends being socketed in the flange member.

3. In combination, a rotatable hub carrying a plurality of radial sockets, a propeller blade arranged axially of each socket, each blade having a hollow shank within a socket, a flange on the end of the shank nearest the hub axis slidably engaging the walls of its socket, a flanged cap secured to the walls of each socket and slidably engaging the blade shank therein, a series of helical spring elements within the space between the walls of the socket and the blade shank, one end of each spring being fixed to the flanged cap of its socket and the other end to the shank flange, with a hoop encircling each series of spring elements and fixed thereto, so as to restrict radial movement thereof, whereby centrifugal force generated by rotation of the blades about the hub axis tends to compress the springs and rotate the blade about its longitudinal axis, thus varying its pitch.

4. In combination, a rotatable hub carrying a plurality of radial sockets, a propeller blade arranged axially of each socket, each blade having a hollow shank within a socket, a flange on the end of the shank nearest the hub axis slidably engaging the walls of its socket, a flanged cap secured to the walls of each socket and slidably engaging the blade shank therein, a series of helical spring elements within the space between the walls of the socket and the blade shank, one end of each spring being fixed to the flanged cap of its socket and the other end to the shank flange, each blade shank having a rack engaging a pinion keyed to a stub shaft carrying a gear, the gear thus connected to the blade meshing with a master toothed wheel, the axis of which is coincident with that of the hug whereby centrifugal force generated by rotation of the blades about the hub axis tends to compress the springs and rotate each blade about its longitudinal axis, thus varying its pitch, the master toothed wheel and associated mechanism acting as an equalizer to insure uniform reaction on all of the blades.

JOSEPH N. GILBERT.